United States Patent
Song et al.

(10) Patent No.: US 9,054,367 B2
(45) Date of Patent: Jun. 9, 2015

(54) RECHARGEABLE BATTERY ASSEMBLY AND PACK INCLUDING THE SAME

(71) Applicant: Samsung SDI Co., Ltd., Gyeonggi-do (KR)

(72) Inventors: Young-Bae Song, Gyeonggi-do (KR); Chang-Kwon Jung, Gyeonggi-do (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 161 days.

(21) Appl. No.: 13/689,587

(22) Filed: Nov. 29, 2012

(65) Prior Publication Data

US 2013/0196204 A1    Aug. 1, 2013

Related U.S. Application Data

(60) Provisional application No. 61/593,759, filed on Feb. 1, 2012.

(51) Int. Cl.
| | |
|---|---|
| *H01M 2/20* | (2006.01) |
| *H01M 2/10* | (2006.01) |
| *H01M 2/02* | (2006.01) |

(52) U.S. Cl.
CPC ............ *H01M 2/204* (2013.01); *H01M 2/1016* (2013.01); *H01M 2/0202* (2013.01); *H01M 2/202* (2013.01); *H01M 2/105* (2013.01)

(58) Field of Classification Search
CPC . H01M 2/022; H01M 2/0202; H01M 2/0245; H01M 2/1077; H01M 2/202
See application file for complete search history.

(56) References Cited

U.S. PATENT DOCUMENTS

| | | | |
|---|---|---|---|
| 6,240,637 B1 * | 6/2001 | Ikeda et al. | 29/854 |
| 2005/0079408 A1 * | 4/2005 | Hirano | 429/82 |
| 2006/0105624 A1 * | 5/2006 | Yoshikane et al. | 439/500 |
| 2008/0057393 A1 * | 3/2008 | Onuki et al. | 429/159 |
| 2010/0047676 A1 | 2/2010 | Park et al. | |
| 2010/0255355 A1 * | 10/2010 | Park et al. | 429/91 |
| 2011/0091759 A1 | 4/2011 | Song | |
| 2013/0004821 A1 * | 1/2013 | Liang | 429/120 |

FOREIGN PATENT DOCUMENTS

| | | |
|---|---|---|
| EP | 0 727 833 A1 | 8/1996 |
| EP | 2 034 539 A1 | 3/2009 |

(Continued)

OTHER PUBLICATIONS

Extended European Search Report dated May 24, 2013 for European Patent Application No. EP 12 19 5533.0 which claims priority from U.S. Appl. No. 61/593,759, filed Feb. 1, 2012; and captioned U.S. Appl. No. 13/689,587.

*Primary Examiner* — Ula C Ruddock
*Assistant Examiner* — Scott J Chmielecki
(74) *Attorney, Agent, or Firm* — Knobbe Martens Olson & Bear LLP

(57) ABSTRACT

A rechargeable battery assembly is disclosed. The rechargeable battery assembly holds rechargeable battery cells. The battery cells are oriented so as to have all of the positive terminals at the one end of the assembly and the negative terminals at the other end. The positive and negative terminals are respectively connected together by positive and negative tabs, which have connection holes substantially equidistant from each of the positive and negative terminals of the battery cells. In some embodiments, multiple assemblies are connected to form a battery pack.

20 Claims, 11 Drawing Sheets

(56) References Cited

FOREIGN PATENT DOCUMENTS

| EP | 2 284 928 A2 | 2/2011 |
| --- | --- | --- |
| EP | 2 325 926 A1 | 5/2011 |
| JP | 2004-171856 A | 6/2004 |
| KR | 10-2008-0013040 A | 2/2008 |
| KR | 10-2011-0041873 A | 4/2011 |
| KR | 10-1201066 B1 | 11/2012 |
| WO | WO 2011/038908 A1 | 4/2011 |

* cited by examiner

RECHARGEABLE BATTERY ASSEMBLY AND PACK INCLUDING THE SAME

CROSS-REFERENCE TO RELATED APPLICATIONS

This application claims priority to and the benefit of U.S. Patent Application No. 61/593,759 filed in the USPTO on Feb. 1, 2012, the entire contents of which are incorporated herein by reference.

BACKGROUND

1. Field

The disclosed technology relates to a rechargeable battery assembly including a plurality of cells and a rechargeable battery pack having a plurality of rechargeable battery assemblies.

2. Description of the Related Technology

A rechargeable battery can be repeatedly charged and discharged, unlike a primary battery. A small sized rechargeable battery is used as a power supply for small electronic devices such as cellular phones, notebook computers, and camcorders, while a medium or large sized rechargeable battery is used as a power supply for driving motors in hybrid vehicles and the like.

The rechargeable battery may be used as a single cell, or may be used in a rechargeable battery pack formed by connecting a plurality of cells in parallel or in series increased capacity. For example, the rechargeable battery pack often uses a tab connecting the plurality of cells in parallel or in series, and has a structure in which current is provided from one side tab.

When a rechargeable battery pack is manufactured with a plurality cells in parallel or in series, a tab is welded in each of the cells. Management of welding quality is difficult and quality and productivity suffer. Further, ideal insulation between the cells in a pack may be difficult to realize, and thus an explosion may occur, causing severe damage.

A difference in lengths of discharging paths in the plurality of cells connected in parallel causes non-uniformity in current sourcing distribution among the cells. That is, current outputs of certain cells in the pack are lower or greater than current output of another cell. As a result, cell life-span and maximum current output is reduced.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a battery assembly, including a plurality of battery cells, each including a positive and a negative terminal, a positive tab connected to the positive terminal of each of the battery cells, and a negative tab connected to the negative terminal of each of the battery cells. Each of the positive and negative tabs respectively include a connection hole substantially equidistant from each of the positive and negative terminals of the battery cells.

Another inventive aspect is a battery pack, including a plurality of battery assemblies, each battery assembly including a plurality of battery cells, each including a positive and a negative terminal, a positive tab connected to the positive terminal of each of the battery cells, and a negative tab connected to the negative terminal of each of the battery cells. Each of the positive and negative tabs respectively include a connection hole substantially equidistant from each of the positive and negative terminals of the battery cells, and a plurality of bus bars, each connecting adjacent tabs.

Another inventive aspect is a battery pack, including a plurality of battery assemblies, each battery assembly including a plurality of battery cells, each including a positive and a negative terminal, a positive tab connected to the positive terminal of each of the battery cells, and a negative tab connected to the negative terminal of each of the battery cells, where each of the positive and negative tabs respectively include a connection hole substantially equidistant from each of the positive and negative terminals of the battery cells. The battery pack also includes a plurality of bus bars, each connecting a positive tab of one battery assembly to a negative tab of an adjacent assembly, first and second connectors, respectively forming positive and negative terminals of the battery pack, and a plurality of connection lines, each connecting one of the battery assemblies to one of the first and second connectors.

DETAILED DESCRIPTION OF CERTAIN INVENTIVE EMBODIMENTS

Figure 1:
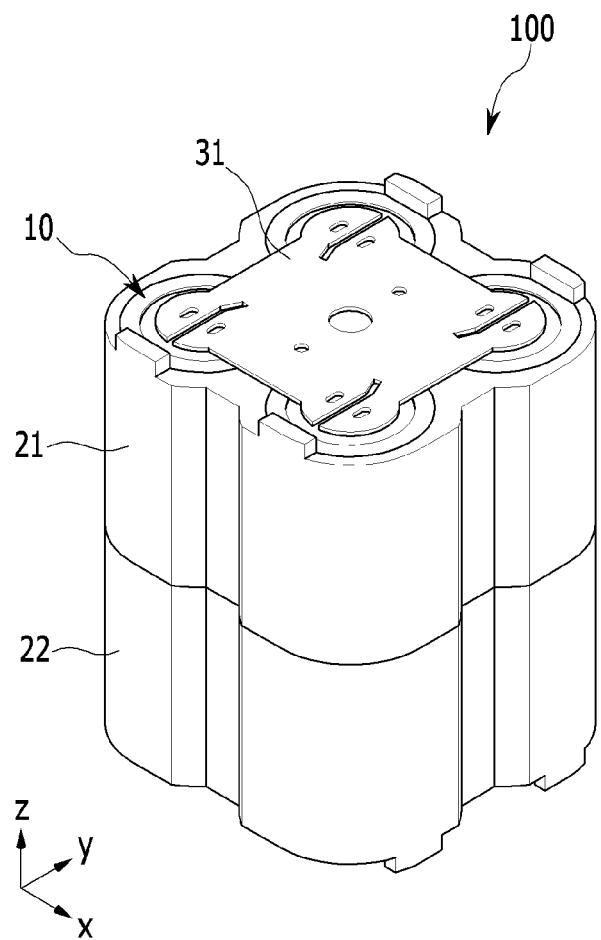
FIG. 1 is a perspective view of a rechargeable battery assembly according to a first exemplary embodiment.

Various aspects are described more fully hereinafter with reference to the accompanying drawings, in which exemplary embodiments are shown. As those skilled in the art would realize, the described embodiments may be modified in various ways, without departing from the spirit or scope of the present invention. The drawings and description are to be regarded as illustrative in nature and not restrictive. Like reference numerals generally designate like elements throughout the specification.

Figure 2:
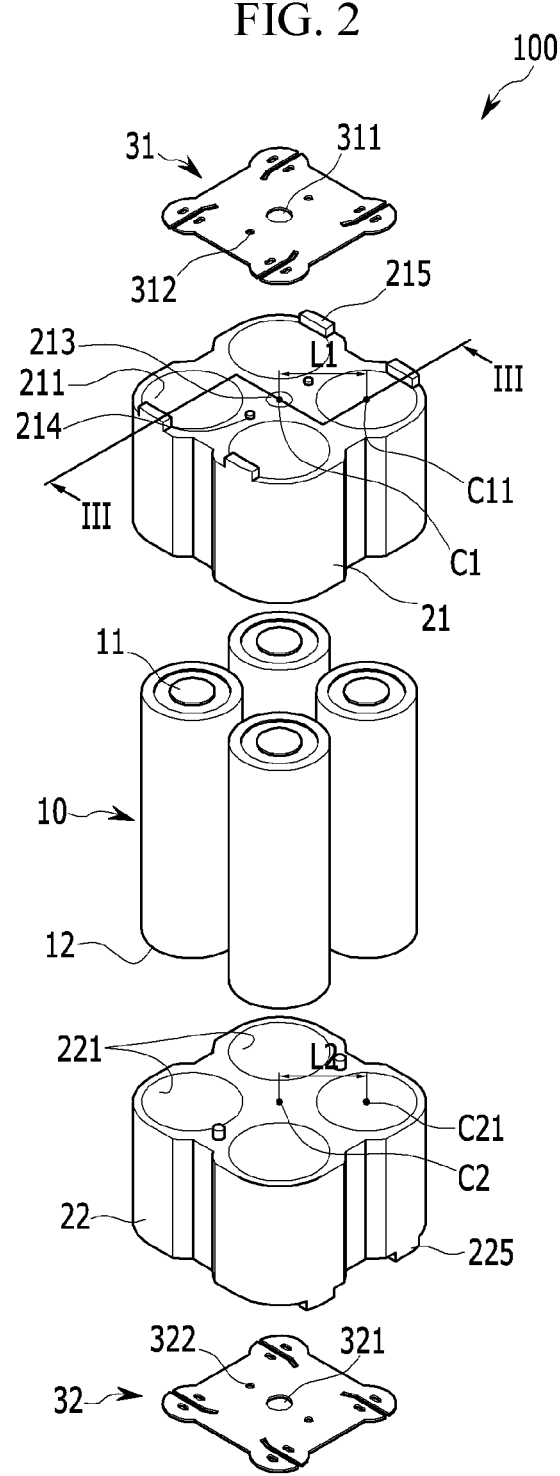
FIG. 2 is an exploded perspective view of the rechargeable battery assembly of FIG. 1.

FIG. 1 is a perspective view of a rechargeable battery assembly 100 according to first exemplary embodiment and FIG. 2 is an exploded perspective view of the rechargeable battery assembly 100 of FIG. 1. Referring to FIG. 1 and FIG. 2, the rechargeable battery assembly 100 includes a plurality of battery cells 10, each including a rechargeable battery, first and second holders 21 and 22 receiving the battery cells 10 and coupled to each other, and first and second tabs 31 and 32 connecting terminals of the battery cells in parallel.

For example, the battery cells 10 may each include a cylindrical rechargeable battery that can be repeatedly charged and discharged. That is, the battery cell 10 includes an electrode assembly which has a positive electrode and a negative electrode layered or wound with a separator interposed therebetween, a can holding an electrolyte solution and the electrode assembly, and a cap (not shown) fastened to the can with an air-tight structure and electrically connected to the electrode assembly.

The first holder 21 receives an upper portion of the battery cell 10 and the second holder 22 receives a lower portion of the battery cell 10. That is, the first holder 21 extends downward from a first terminal (for convenience, referred to as a positive terminal) 11 in the upper portion of the battery cell 10, and the second holder 22 extends upward from a second terminal (for convenience, referred to as a negative terminal) 12 and is coupled to the first holder 21 such that the first and second holders 21 and 22 receive the battery cells 10.

The first and second holders 21 and 22 respectively include receiving portions 211 and 221, each being formed in the shape of a cylindrical hole corresponding to the shape (i.e., cylinder shape) of the battery cells 10 to receive the battery cells 10. When the first and second holders 21 and 22 are coupled to each other, the receiving portions 211 and 221 are connected to each other to correspond to the battery cells 10. The number of receiving portions 211 and 221 correspond to the number of battery cells 10 provided in the rechargeable battery assembly 100.

The rechargeable battery assembly 100 of the first exemplary embodiment includes four receiving portions 211 and 221 in each of the first and second holders 21 and 22 and includes four battery cells 10 corresponding to the four receiving portions. In some embodiments, the rechargeable battery assembly includes, for example, two or three receiving portions in the first and second holders and includes a corresponding number of battery cells 10 in the receiving portions.

The first holder 21 separates neighboring receiving portions 211, and the second holder 22 separates neighboring receiving portions 221. The first and second holders 21 and 22 may be formed of flame retardant materials and may receive the battery cells 10 in the separated state such that an insulation structure is formed between the respective battery cells 10. For example, the first and second holders 21 and 22 may be formed of polyphenylene sulfide (PPS) resins. Thus, the first and second holders 21 and 22 can prevent explosion of neighboring battery cells 10 when one of the battery cells 10 explode.

The receiving portions 211 and 221 are symmetric with reference to first and second centers C1 and C2 of the first and second holders 21 and 22. The first and second centers C1 and C2 of the first and second holders 21 and 22 are aligned in the up and down direction (i.e., z-axis direction). In the first exemplary embodiment, four receiving portions 211 and 221 are provided and they can receive four battery cells 10 in a symmetric arrangement.

First and second distances L1 and L2 from the first and second centers C1 and C2 of the first and second holders 21 and 22 to centers C11 and C21 of respective receiving portions 211 and 221 are substantially equivalent to each other. In the first holder 21, the first distance L1 is a distance from the center C1 of the first holder 21 to each of the centers C11 of the four receiving portions 211, and thus the distances from the first center C1 of the first holder 21 to the centers C11 of the respective receiving portions 211 are substantially equivalent to each other. Further, in the second holder 22, the second distance L2 is a distance from the center C2 of the second holder 22 to the respective centers C21 of the respective four receiving portions 221 in the second holder 22, and thus the distances from the center C2 to the centers C21 of the four receiving portions 221 are substantially equivalent to each other.

The four centers C11 of the first holder 21 are disposed on corners of a square, and the four centers C21 of the second holder 22 are disposed on corners of a square. In addition, the centers C11 of the first holder 21 and the centers C21 of the second holder 22 are aligned in the z-axis direction.

If the first and second holder form three receiving portions, the centers of the receiving portions may be disposed on corners of a triangle, and the first and second centers may be disposed in the center of the triangle (not shown).

Figure 3:
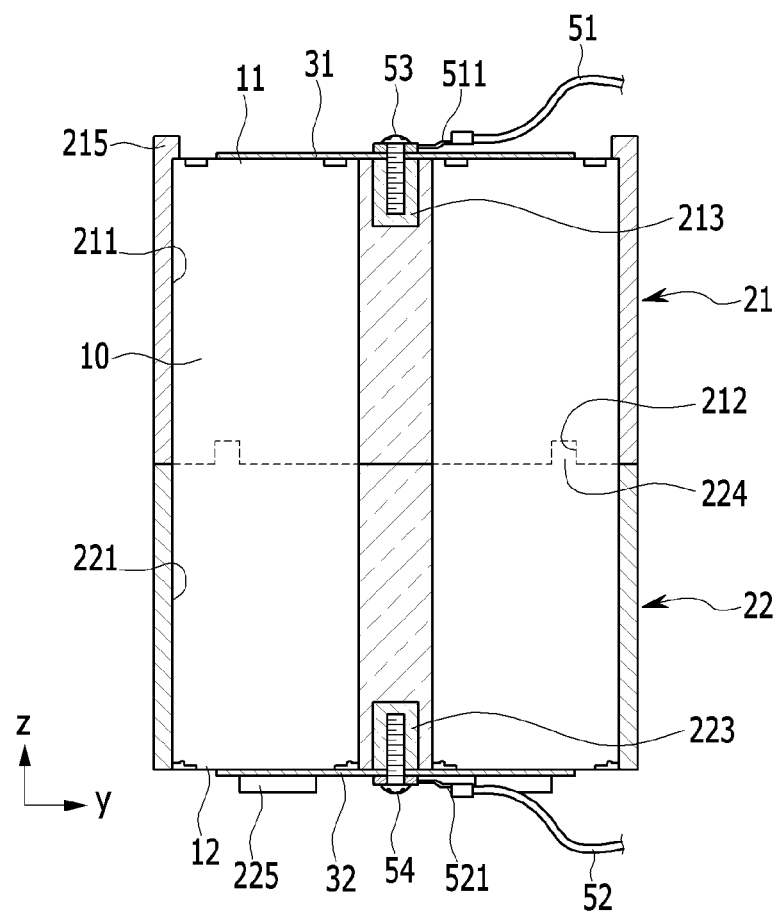
FIG. 3 is a cross-sectional view of FIG. 2, taken along the line III-III.

FIG. 3 is a cross-sectional view of FIG. 2, taken along the line III-III. Referring to FIG. 2 and FIG. 3, a first tab 31 connects positive terminals 11 of the battery cells 10 on the first holder 21 side, and a second tab 32 connects negative terminals 12 of the battery cells 10 on the opposite side of the assembly 100 as the first tab 31.

In some embodiments, the first and second tabs 31 and 32 are respectively formed of nickel (Ni) tabs and may be respectively connected to the positive and negative terminals 11 and 12 by projection welding. Thus, the four battery cells 10 connected in parallel can be charged and discharged under the same condition through the first and second tabs 31 and 32. Since the receiving portions 211 and 221 are symmetrically disposed in the first and second holders 21 and 22, the first and second tabs 31 and 32 connecting the battery cells 10 in the receiving portions 211 and 221 are formed in a symmetric structure corresponding to the receiving portions 211 and 221.

The first and second tabs 31 and 32 respectively include connection holes 311 and 321 in the centers thereof. The connection holes 311 and 321 respectively face the first and second centers C1 and C2 of the first and second holders 21 and 22. Thus, a distance from the center C11 of the receiving portion 211 of each of the positive terminals 11 to the center of the connection hole 311 of the first tab 31 is substantially equivalent to the distance L1 between the center C1 of the first holder 21 and the center 211 of the receiving portion 211. In addition, a distance from the center C21 of the receiving portion 221) of each of the negative terminals 12 to the center of the connection hole 321 of the second tab 32 is substantially equivalent to the distance L2 between the center C2 of the second holder 22 and the center C21 of the receiving portion 221.

The first and second holders 21 and 22 are respectively provided with a coupling groove 212 and a coupling protrusion 224 in a lower side and an upper side that face each other in a z-axis direction of the battery cell 10. The coupling groove 212 and the coupling protrusion 224 are of corresponding shapes and sizes so as to be coupled to each other to form a tight press fitting such that the first and second holders 21 and 22 effectively form a single unit holding the battery cells 10. The coupling groove 212 and the coupling protrusion 224 are formed as one or more corresponding pairs so as to face each other in the first and second holders 21 and 22, and they may be provided, for example, as one pair or as four pairs (not shown). In some embodiments, each of the four pairs is formed around one set of corresponding receiving portions 211 and 221.

The first holder 21 supports the positive terminal 11 side of each of the received battery cells 11 with a first stopper 215 protruding toward the center C1 from an upper end of the first holder 21 to thereby prevent separation of the battery cells 10. In addition, the second holder 22 includes a second stopper 225 protruding toward the center C2 from a lower end of the second holder 22 to support the negative terminal 12 side of each of the received battery cells 10 to thereby prevent separation of the battery cells 10.

Four first stoppers 215 are formed as opposing pairs on both sides in the y-axis direction of the first holder 21, and four second stoppers 225 are formed as opposing pairs on both sides in the y-axis direction of the second holder 22. Thus, the battery cells 10 can be stably received and held in the receiving portions 211 and 221 of the first and second holders 21 and 22.

The first and second holders 21 and 22 are respectively provided with insert nuts 213 and 223 insert-molded in the centers C1 and C2. That is, the insert nuts 213 and 223 face the connection holes 311 and 321 of the first and second tabs 31 and 32.

The insert nuts 213 and 223 are fastened to set screws 53 and 54 securing terminals 511 and 521 of first and second conductive lines 51 and 52 to the first and second tabs 31 and 32 through the connection holes 311 and 321. The first conductive line 51 is connected to the positive terminal 11 and provides a connection to the positive electrode of the rechargeable battery assembly 100. The second conductive line 52 is connected to the negative terminal 12 and provides a connection to the negative electrode of the rechargeable battery assembly 100.

In this case, the first tab 31 provides equal lengths of distance L1 for charging and discharging current paths respectively connecting to conductive line 51 from the positive terminals 11 of the four battery cells 10. The second tab 32 provides equal lengths of distance L2 for charging and discharging current paths connecting to conductive line 52 from the negative terminals 12 of the four battery cells 10. Accordingly, distribution of charging and discharging currents is balanced between the four battery cells 10.

Thus, temperature imbalance of the four battery cells 10 is minimized. In addition, an exothermic temperature deviation in the first and second tabs 31 and 32 is also minimized. In addition, charging and discharging outputs of the respective battery cells 10 can be equivalent to or better than that of a single battery cell. Accordingly, variation of the battery cell life-span in the rechargeable battery assembly 100 is minimized.

In addition, the insert nuts 213 and 223 enable connection of a bus bar (not shown) for discharging of a large amount of current. That is, multiple rechargeable battery assemblies 100 may be disposed and the bus bar may be connected to insert nuts 213 and 223 of the rechargeable battery assemblies 100 such that set screws inserted through connection holes in the bus bars can be fastened to the insert nuts 213 and 223.

The first and second holders 21 and 22 each include a pair of fixing protrusions 214 on opposite sides of the connection holes 311 and 321 The fixing protrusions 214 are respectively coupled to fixing holes 312 and 322 formed on opposite sides of the connection holes 311 and 321 of the first and second tabs 31 and 32.

The fixing protrusions 214 and the fixing holes 312 and 322 are formed to correspond to each other to fix the first and second tabs 31 and 32 respectively to the first and second holders 21 and 22 before connecting, for example, by projection-welding, the first and second tabs 31 and 32 respectively to the positive and negative terminals 11 and 12 of the battery cell 10, and accordingly the process for connecting the first and second tabs 31 and 32 with respect to the battery cell 10 is simplified.

Figure 4:
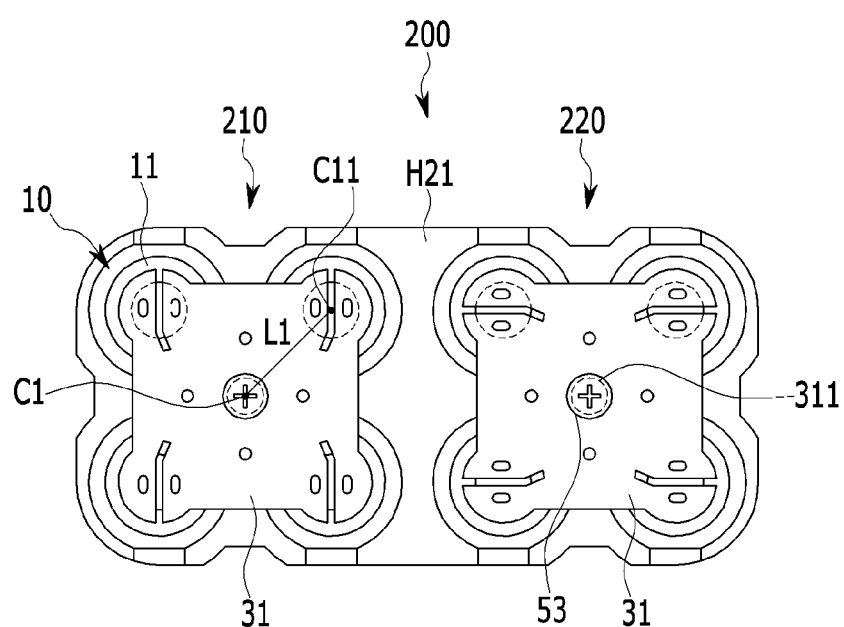
FIG. 4 is a top plan view of a rechargeable battery assembly according to a second exemplary embodiment.

FIG. 4 is a top plan view of a rechargeable battery assembly 200 according to a second exemplary embodiment. Referring to FIG. 4, the rechargeable battery assembly 200 is formed by connecting 8 battery cells 10 in parallel.

The rechargeable battery assembly 100 of the first exemplary embodiment is formed by connecting 4 battery cells in parallel, and the rechargeable battery assembly 200 of the second exemplary embodiment includes a first parallel connection portion 210 having four battery cells 10 connected in parallel and a second parallel connection portion 220 having 4 additional battery cells 10 connected in parallel.

A first holder H21 receives upper portions of the eight battery cells 10 and a second holder (not shown) receives lower portions of the eight battery cells 10. In the first and second parallel connection portions 210 and 220, the first holder H21 and the second holder are formed with the same structure of the first and second holders 21 and 22 of the first exemplary embodiment and are similarly coupled to each other. However, the first holder H21 and the second holder of the second exemplary embodiment receive eight battery cells 10.

Two first tabs 31 each connect four positive terminals 11 of the battery cells 10 on the first holder H21 side. That is, the two first tabs 31 are respectively welded to the positive terminals 11 on the first and second parallel connection portions 210 and 220 of the first holder H21. In this case, first distances L1 from the centers C1 of the first and second parallel connection portions 210 and 220 of the first holder H21 to eleventh centers C11 of the positive terminals 11 are substantially equivalent to each other.

Second tabs (not shown) are substantially the same as the first tabs 31 and are provided to similarly connect the four negative terminals of the battery cells 10 in parallel on the opposite side of from the first tabs 31. That is, the two second tabs are respectively welded to the negative electrodes in the first and second parallel connection portions of the second holder. In this case, second distances from second centers of the first and second parallel connection portions 210 and 220 of the second holder to twenty-first centers of the negative terminals are set to be substantially equivalent to each other.

A set screw 53 is fastened to an insert nut through a connection hole 311 of the first tab 21 such that a conductive line or a bus bar can be connected to the first tabs 31. In addition, a set screw is fastened to an insert nut through a connection hole of the second tabs such that a conductive line or a bus bar can be connected to the second tabs (not shown).

Accordingly, uniform distribution of charging and discharging currents can be realized between the eight battery cells 10. The rechargeable battery assembly 200 according to the second exemplary embodiment can realize a larger capacity than the rechargeable battery assembly 100 of the first exemplary embodiment.

Figure 5:
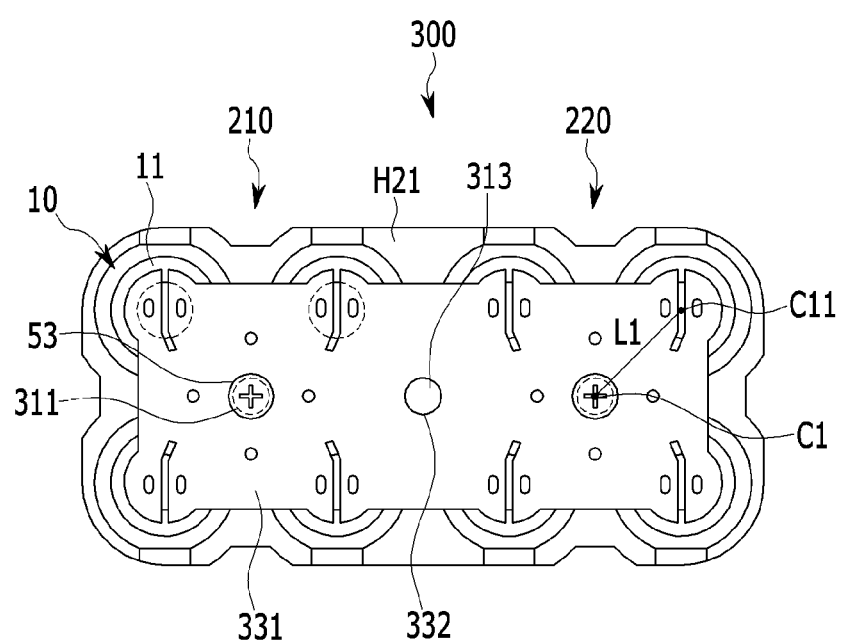
FIG. 5 is a top plan view of a rechargeable battery assembly according to a third exemplary embodiment.

FIG. 5 is a top plan view of a rechargeable battery assembly 300 according to a third exemplary embodiment. Referring to FIG. 5, the rechargeable battery assembly 300 of the third exemplary embodiment includes an integrally formed a first tab 331 connecting eight battery cells 10 in parallel. A second tab (not shown) is also included on the opposite side of the assembly 300, a description of the second tab will be omitted because the second tab may, for example, have substantially the same structure of the first tab 331.

The first tab 331 connects positive terminals 11 of the battery cells 10 on a first holder H21 side. That is, the first tab 331 is fixed to the first holder H21 by set screws 53 fastened to insert nuts through two connection holes 311, and welded to the positive terminals 11.

In this case, first distances L1 from first centers C1 of first and second parallel connection portions 210 and 220 of the first holder H21 to eleventh centers C11 of the positive terminals 11 are set to be substantially equivalent to each other. Conductive lines (not shown) may be respectively connected to the first centers of the first and second parallel connection portions 210 and 220 by the set screws 53.

In addition, a sensing hole 332 may further be provided between the first and second parallel connection portions 210 and 220 of the first tab 331 for connection of sensing terminals to detect a current and a voltage of the rechargeable battery assembly 300. The first holder H21 further includes an insert nut 313 corresponding to the sensing hole 332 to enable fastening of a set screw (not shown) that attaches the sensing terminal.

Although not illustrated, the second exemplary embodiment of FIG. 4 and the third exemplary embodiment of FIG. 5 may be both included in the rechargeable battery assembly. For example, the rechargeable battery assembly may be formed by including four battery cells in parallel with the first tab 31 of FIG. 4 and connecting eight battery cells in series with the first tab 331 of FIG. 5. In this case, the first tab of FIG. 5 also performs a role of a bus bar connecting the first and second parallel connection portions in series.

Figure 6:
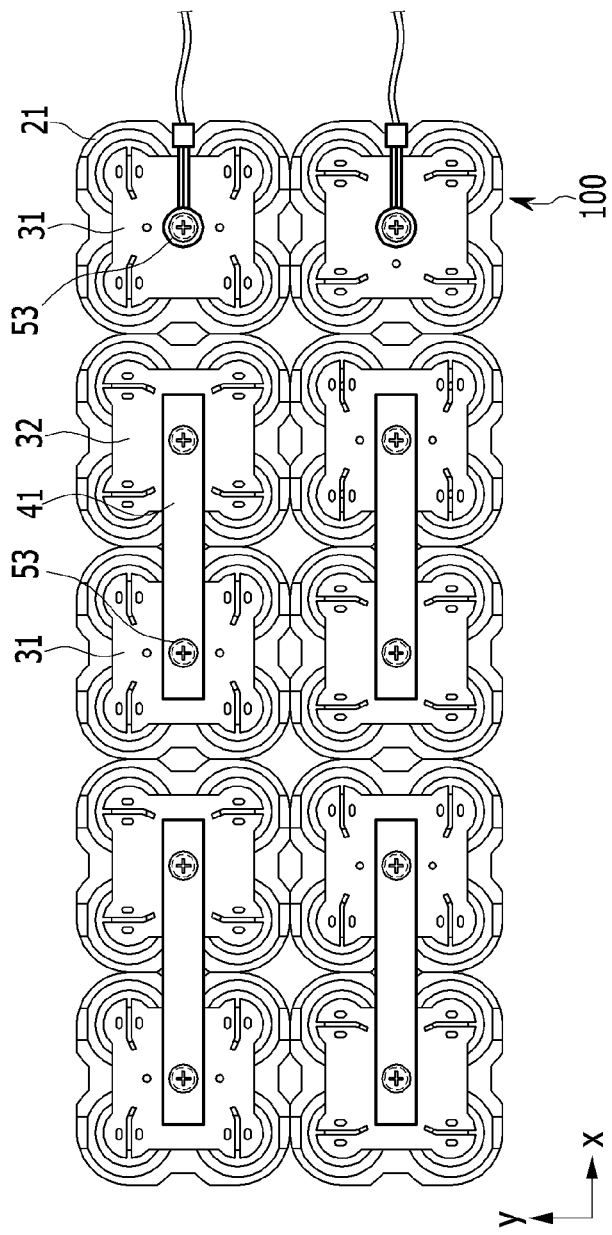
FIG. 6 is a top plan view of a rechargeable battery pack employing the rechargeable battery assembly of FIG. 1 according to a fourth exemplary embodiment.
Figure 7:
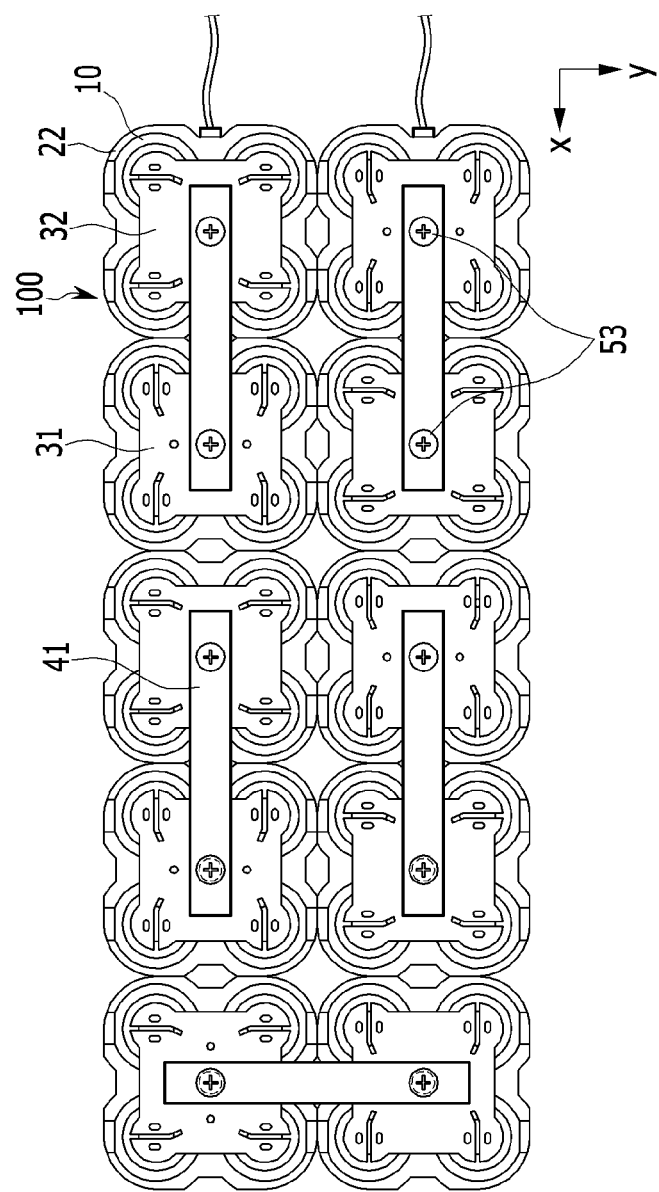
FIG. 7 is a bottom view of FIG. 6.

FIG. 6 is a top plan view of a rechargeable battery pack 400 including the rechargeable battery assembly 100 of FIG. 1 according to a fourth exemplary embodiment and FIG. 7 is a bottom view the embodiment of FIG. 6. Referring to FIG. 6 and FIG. 7, the rechargeable battery pack 400 is formed by serially connecting ten rechargeable battery assemblies 100 each including four battery cells 10 in parallel.

In FIG. 6, first and second tabs 31 and 32 disposed on first and second holders 21 and 22 on an upper side of the rechargeable battery pack 400 are connected with each other by a bus bar 41, and, in FIG. 7, first and second tabs 31 and 32 disposed on first and second holders 21 and 22 on a bottom side of the rechargeable battery pack 400 are connected with each other by a bus bar 41. That is, bus bars 41 are disposed in connection holes of first and second tabs of adjacent rechargeable battery assemblies 100 and the bus bars 41 are fixed using the set screws 53 such that the first and second tabs 31 and 32 are electrically connected by the bus bar 41. The rechargeable battery pack 400 of the fourth exemplary embodiment can realized a high voltage. In this case, the four battery cells 10 of each of the rechargeable battery assemblies 100 realize uniform distribution of charging and discharging currents.

Figure 8:
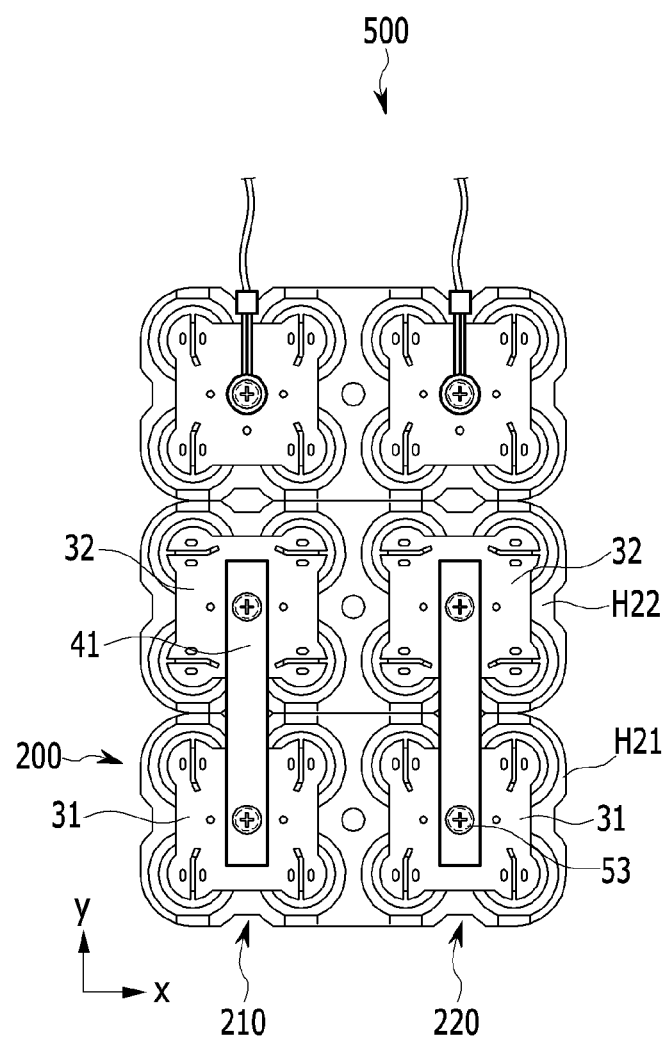
FIG. 8 is a top plan view of a rechargeable battery pack employing the rechargeable battery assembly of FIG. 4 according to a fifth exemplary embodiment.
Figure 9:
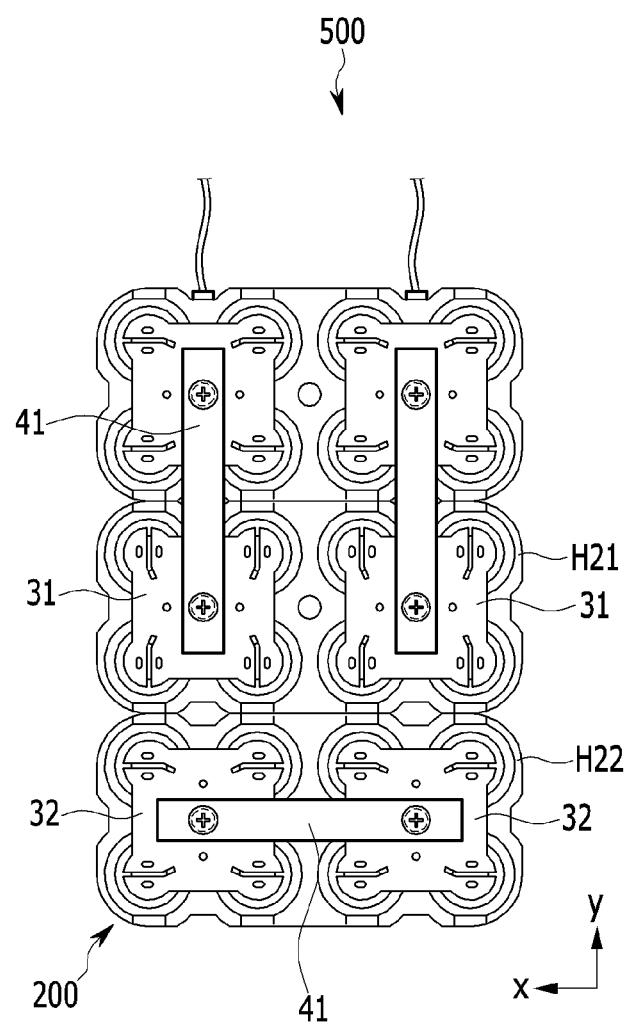
FIG. 9 is a bottom view of FIG. 8.

FIG. 8 is a top plan view of a rechargeable battery pack 500 including the rechargeable battery assembly 200 of FIG. 4 according to a fifth exemplary embodiment, and FIG. 9 is a bottom view of the battery pack 500 of FIG. 8. Referring to FIG. 8 and FIG. 9, the rechargeable battery pack 500 is formed by serially connecting three rechargeable battery assemblies 200, each having eight battery cells 10 in parallel. Among the eight battery cells 10, four battery cells 10 are connected in parallel in a first parallel connection portion 210 and four battery cells 10 are connected in parallel in a second parallel connection portion 220.

In FIG. 8, first and second tabs 31 and 32 disposed on first and second holders H21 and H22 on an upper side of the rechargeable battery pack 500 are connected with each other by a bus bar 41, and in FIG. 9, first and second tabs 31 and 32 disposed on first and second holders H21 and H22 on a bottom side of the rechargeable battery pack 500 are connected with each other by a bus bar 41. The bus bars 41 are disposed in connection holes of the first and second tabs 31 32 of neighboring adjacent battery assemblies and the bus bars 41 are fixed using set screws 53 such that the first and second tabs 31 and 32 are electrically connected by the bus bars 41. The rechargeable battery pack 500 of the fifth exemplary embodiment can realize a high voltage. In this case, the four battery cells 10 of each of the rechargeable battery assemblies 200 can realize uniform distribution of charging and discharging currents.

Figure 10:
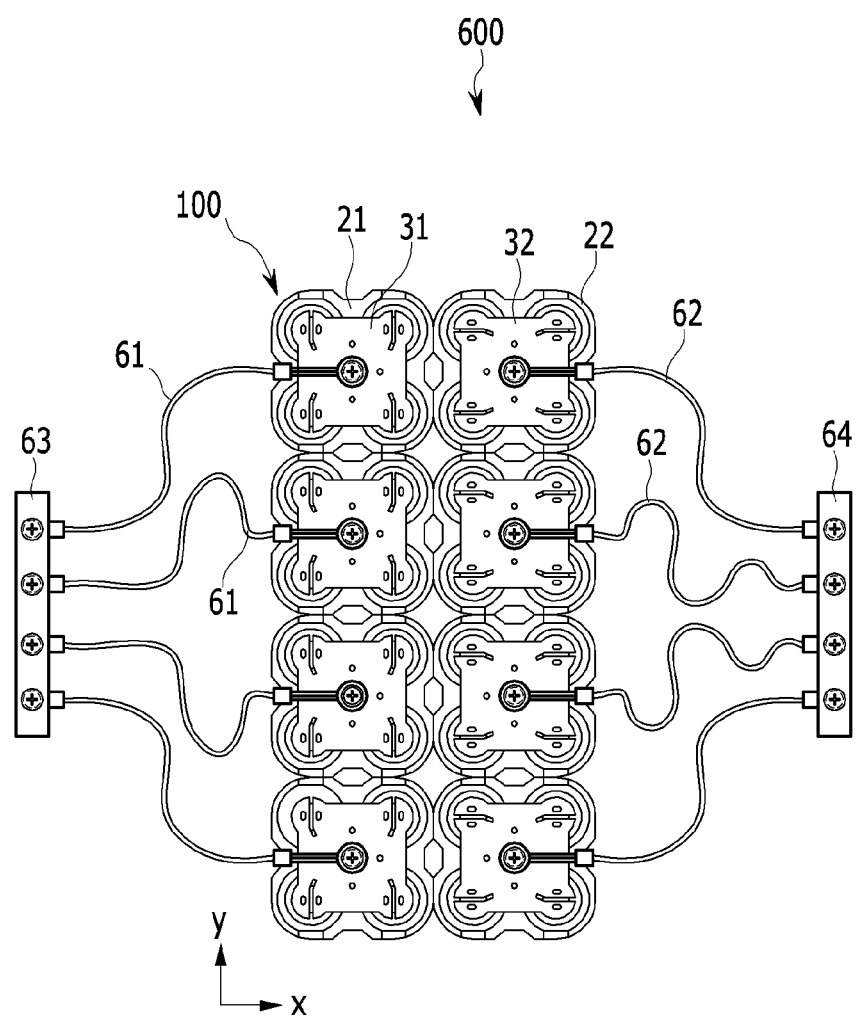
FIG. 10 is a top plan view of a rechargeable battery pack employing the rechargeable battery assembly of FIG. 1 according to a sixth exemplary embodiment.
Figure 11:
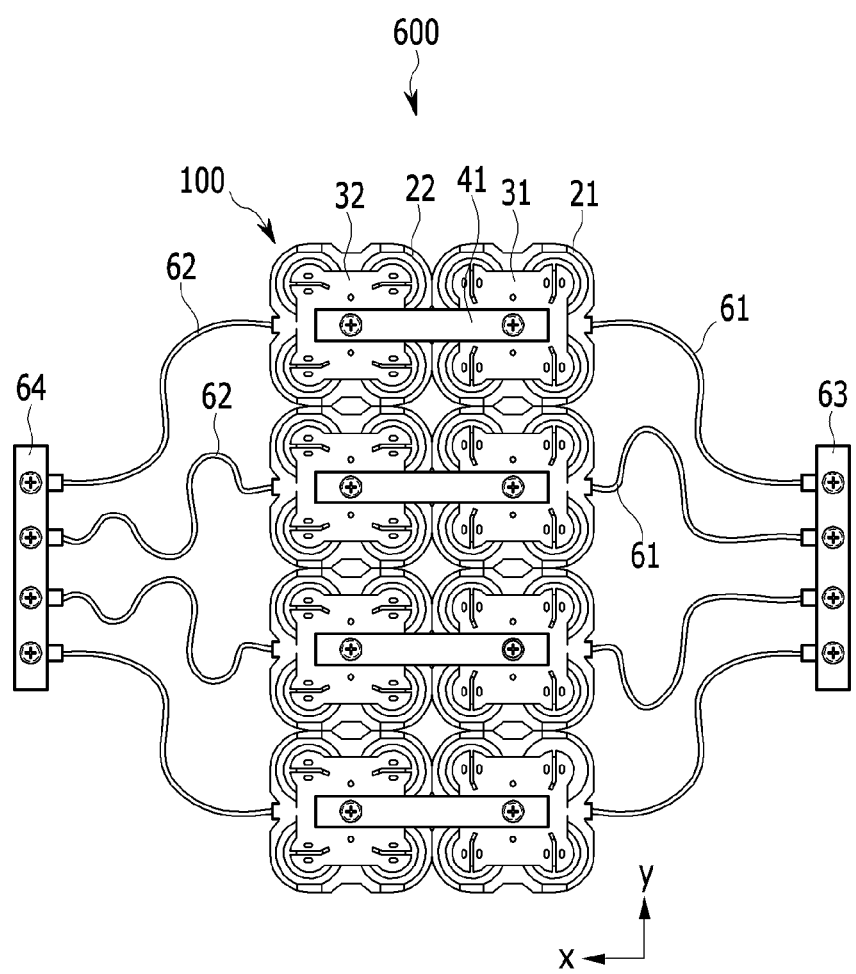
FIG. 11 is a bottom view of FIG. 10.

FIG. 10 is a top plan view of a rechargeable battery pack 600 including the rechargeable battery assembly 100 of FIG. 1 according to a sixth exemplary embodiment, and FIG. 11 is a bottom view of the battery pack 600 of FIG. 10. Referring to FIG. 10 and FIG. 11, the rechargeable battery pack 600 includes eight rechargeable battery assemblies 100 each having four battery cells 10 connected in parallel.

In FIG. 10, first and second conductive lines 61 and 62 are respectively connected to first and second tabs 31 and 32 of first and second holders 21 and 22 on an upper side of the rechargeable battery pack 600, and in FIG. 11, first and second tabs 31 and 32 of first and second holders 21 and 22 on a lower side of the rechargeable battery pack 600 are connected with each other by a bus bar. The bus bars 41 connect adjacent pairs of first and second tabs 31 and 32 through connection holes 311 and 321 of the first and second tabs 31 and 32 on lower sides of the rechargeable battery assemblies 100.

On upper sides of the rechargeable battery assemblies 100, first conductive lines 61, each having the same length are respectively connected to the connection holes 311 of the first tabs 31 at one end thereof and the other ends of the first conductive lines 61 are connected to a first connector 63. Second conductive lines 62, each having the same length, are respectively connected to the connection holes 321 of the second tabs 32 at one end thereof and the other ends of the second conductive lines 62 are connected to a second connector 64.

The rechargeable battery pack 600 of the sixth exemplary embodiment can realize high capacity. In this case, four battery cells 10 of each of the rechargeable battery assemblies 100 can realize uniform distribution of charging and discharging currents.

While various aspects have been described in connection with what is presently considered to be practical exemplary embodiments, it is to be understood that the invention is not limited to the disclosed embodiments, but, on the contrary, is intended to cover various modifications and equivalent arrangements.

What is claimed is:

1. A battery assembly, comprising:
   a plurality of battery cells, each comprising a positive and negative terminal;
   a positive tab connected to the positive terminal of each of the battery cells; and
   a negative tab connected to the negative terminal of each of the battery cells,
   wherein each of the positive and negative tabs respectively comprise a conductive connection hole substantially equidistant from each of the positive and negative terminals of the battery cells, and wherein the conductive connection hole receives a conductive connector, wherein the connector has a first portion located above a surface of the tab and a second portion passing through the conductive connection hole in the tab.

2. The battery assembly of claim 1, further comprising:
   a first holder, comprising:
   a plurality of openings, each opening configured to receive a first portion of one of the battery cells, and
   one or more coupling protrusions; and
   a second holder, comprising:
   a plurality of openings, each opening configured to receive a second portion of one of the battery cells, and
   one or more coupling grooves, wherein the first openings of the first holder are aligned with the second openings of the second holder such that each pair of first and second openings receives one of the battery cells, and wherein the coupling protrusions of the first holder are press fit into the coupling grooves, whereby the first and second holders are secured to one another.

3. The battery assembly of claim 2, wherein each of the first and second holders comprise one or more fixing protrusions, and each of the positive and negative tabs comprise one or more fixing holes, wherein the positive and negative tabs are respectively fixed to the first and second holders by the fixing protrusions in the fixing holes.

4. The battery assembly of claim 1, wherein each of the positive and negative terminals of the battery cells is connected to the positive tab or to the negative tab by a weld.

5. The battery assembly of claim 2, wherein each of the first and second holders comprises four openings.

6. The battery assembly of claim 1, wherein the connection hole of each of the positive and negative tabs is electrically connected to a conductive line.

7. The battery assembly of claim 6, wherein each of the positive and negative tabs is electrically connected to the corresponding conductive line with a screw.

8. The battery assembly of claim 7, further comprising
a first holder, comprising:
   a plurality of openings, each opening configured to receive a first portion of one of the battery cells, and
   a first insert nut; and
a second holder, comprising:
   a plurality of openings, each opening configured to receive a second portion of one of the battery cells, and
   a second insert nut,
wherein each of the positive and negative tabs is respectively electrically connected to the corresponding conductive line through its connection hole with the screw fastened to one of the first and second insert nuts.

9. A battery pack, comprising:
a plurality of battery assemblies, each battery assembly comprising:
a plurality of battery cells, each comprising a positive and negative terminal;
a positive tab connected to the positive terminal of each of the battery cells; and
a negative tab connected to the negative terminal of each of the battery cells,
   wherein each of the positive and negative tabs respectively comprise a conductive connection hole substantially equidistant from each of the positive and negative terminals of the battery cells, and wherein the conductive connection hole receives a conductive connector, wherein the connector has a first portion located above a surface of the tab and a second portion passing through the conductive connection hole in the tab; and
a plurality of bus bars, each connecting adjacent tabs.

10. The battery pack of claim 9, each battery assembly further comprising:
a first holder, comprising:
   a plurality of openings, each opening configured to receive a first portion of one of the battery cells, and
   one or more coupling protrusions; and
a second holder, comprising:
   a plurality of openings, each opening configured to receive a second portion of one of the battery cells, and
   one or more coupling grooves,
wherein the first openings of the first holder are aligned with the second openings of the second holder such that each pair of first and second openings receives one of the battery cells, and wherein the coupling protrusions of the first holder are press fit into the coupling grooves, whereby the first and second holders are secured to one another.

11. The battery pack of claim 10, wherein each of the first and second holders comprise one or more fixing protrusions, and each of the positive and negative tabs comprise one or more fixing holes, wherein the positive and negative tabs are respectively fixed to the first and second holders by the fixing protrusions in the fixing holes.

12. The battery pack of claim 9, wherein each of the positive and negative terminals of the battery cells is connected to the positive tab or to the negative tab by a weld.

13. The battery pack of claim 10, wherein each of the first and second holders comprises four openings.

14. The battery pack of claim 9, wherein the connection hole of each of the positive and negative tabs is electrically connected to a conductive line.

15. A battery pack, comprising:
a plurality of battery assemblies, each battery assembly comprising:
a plurality of battery cells, each comprising a positive and negative terminal;
a positive tab connected to the positive terminal of each of the battery cells; and
a negative tab connected to the negative terminal of each of the battery cells,
   wherein each of the positive and negative tabs respectively comprise a conductive connection hole substantially equidistant from each of the positive and negative terminals of the battery cells, and wherein the conductive connection hole receives a conductive connector, wherein the connector has a first portion located above a surface of the tab and a second portion passing through the conductive connection hole in the tab;
a plurality of bus bars, each connecting a positive tab of one battery assembly to a negative tab of an adjacent assembly;
first and second connectors, respectively forming positive and negative terminals of the battery pack; and
a plurality of connection lines, each connecting one of the battery assemblies to one of the first and second connectors.

16. The battery pack of claim 15, each battery assembly further comprising:
a first holder, comprising:
   a plurality of openings, each opening configured to receive a first portion of one of the battery cells, and
   one or more coupling protrusions; and
a second holder, comprising:
   a plurality of openings, each opening configured to receive a second portion of one of the battery cells, and
   one or more coupling grooves,
wherein the first openings of the first holder are aligned with the second openings of the second holder such that each pair of first and second openings receives one of the battery cells, and wherein the coupling protrusions of the first holder are press fit into the coupling grooves, whereby the first and second holders are secured to one another.

17. The battery pack of claim 16, wherein each of the first and second holders comprise one or more fixing protrusions, and each of the positive and negative tabs comprise one or more fixing holes, wherein the positive and negative tabs are respectively fixed to the first and second holders by the fixing protrusions in the fixing holes.

18. The battery pack of claim 15, wherein each of the positive and negative terminals of the battery cells is connected to the positive tab or to the negative tab by a weld.

19. The battery pack of claim 16, wherein each of the first and second holders comprises four openings.

20. The battery pack of claim 15, wherein the connection hole of each of the positive and negative tabs is electrically connected to a conductive line.

* * * * *